(12) United States Patent
Yasuda

(10) Patent No.: US 10,130,084 B2
(45) Date of Patent: Nov. 20, 2018

(54) FISHING REEL

(71) Applicant: GLOBERIDE, Inc., Tokyo (JP)

(72) Inventor: Hiromu Yasuda, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 15/638,640

(22) Filed: Jun. 30, 2017

(65) Prior Publication Data

US 2018/0000059 A1   Jan. 4, 2018

(30) Foreign Application Priority Data

Jun. 30, 2016 (JP) ................. 2016-129538
Mar. 31, 2017 (JP) ................. 2017-072455

(51) Int. Cl.
| | |
|---|---|
| *A01K 89/01* | (2006.01) |
| *A01K 89/033* | (2006.01) |
| *A01K 89/015* | (2006.01) |
| *A01K 89/02* | (2006.01) |
| *A01K 89/00* | (2006.01) |

(52) U.S. Cl.
CPC ........ *A01K 89/0117* (2013.01); *A01K 89/015* (2013.01); *A01K 89/011221* (2015.05); *A01K 89/02* (2013.01); *A01K 89/033* (2013.01); *A01K 89/053* (2015.05); *A01K 89/00* (2013.01)

(58) Field of Classification Search
CPC ............ A01K 89/01; A01K 89/011221; A01K 89/0117; A01K 89/029; A01K 89/053; A01K 89/054
See application file for complete search history.

(56) References Cited

U.S. PATENT DOCUMENTS

| | | |
|---|---|---|
| 5,494,232 A | 2/1996 | Hirano et al. |
| 5,662,286 A | 9/1997 | Hirano |
| 5,678,781 A | 10/1997 | Hirano et al. |
| 5,918,825 A | 7/1999 | Hirano et al. |
| 6,113,018 A | 9/2000 | Hirano et al. |
| 9,775,333 B2 * | 10/2017 | Hirayama ........ A01K 89/01122 |

(Continued)

FOREIGN PATENT DOCUMENTS

| | | |
|---|---|---|
| JP | 06-58348 A | 3/1994 |
| JP | 2003-278803 A | 10/2003 |

(Continued)

OTHER PUBLICATIONS

Extended European Search Report EP Application No. 17178934.0 dated Nov. 14, 2017.

*Primary Examiner* — Emmanuel M Marcelo
(74) *Attorney, Agent, or Firm* — Pillsbury Winthrop Shaw Pittman, LLP

(57) ABSTRACT

An object of the present invention is to provide a fishing reel configured to suppress formation of a dead space on the outer circumferential side of an anti-reverse device and thus reduced in size. The fishing reel includes a reel body, a drive shaft caused to rotate by an operation of a handle, an anti-reverse device interposed between the reel body and the drive shaft, and a cylinder-shaped cylindrical member disposed on an outer circumferential side of the anti-reverse device. A switching control member of the anti-reverse device and the cylindrical member are engaged with each other, and a swiveling operation of the cylindrical member causes the drive shaft to switch to an anti-reverse state or a reversible state.

11 Claims, 11 Drawing Sheets

(56) References Cited

U.S. PATENT DOCUMENTS

2011/0174909 A1* 7/2011 Shibata .................. A01K 89/01
                                                            242/230
2016/0113261 A1* 4/2016 Hirayama ........ A01K 89/01122
                                                            242/319
2016/0286775 A1   10/2016 Hirayama et al.

FOREIGN PATENT DOCUMENTS

| JP | 3494546 B2    | 2/2004  |
|----|---------------|---------|
| JP | 2011-155944 A | 8/2011  |
| JP | 2012-019752 A | 2/2012  |
| JP | 2016-082918 A | 5/2016  |
| JP | 2016-189756 A | 11/2016 |

* cited by examiner

FISHING REEL

This application is based on and claims the benefit of priority from Japanese Patent Application Serial No. 2016-129538 (filed on Jun. 30, 2016) and Japanese Patent Application Serial No. 2017-072455 (filed on Mar. 31, 2017), the contents of which are hereby incorporated by reference in their entirety.

TECHNICAL FIELD

The present invention relates to a fishing reel.

BACKGROUND

Conventionally, a fishing reel is provided with an anti-reverse device interposed between a reel body and a drive shaft and configured to, while permitting rotation of the drive shaft in one direction, prevent rotation thereof in the other direction (hereinafter, referred to as "reverse rotation"). In order to obtain an improved hooking capability, such an anti-reverse device is often configured to reduce play of the drive shaft in a reverse rotation direction by utilizing a wedge action of a rolling member. An anti-reverse device of a general type is provided with a switching control member (a retainer) configured to displace the rolling member in a circumferential direction so that the rolling member is prohibited from exerting a wedge action. Swiveling of the switching control member causes the drive shaft to switch between an anti-reverse state and a reversible state. In order to operate such a switching control member to swivel, for example, a fishing spinning reel is provided with a switching lever extending from a rear portion to a front side of a reel body and swingably supported to the reel body (see Japanese Patent Application Publication No. H6-58348, Japanese Patent Application Publication No. 2003-278803, and Japanese Patent No. 3494546). In such a fishing spinning reel, a cam formed at a front portion of the switching lever and a radially outward projecting part of the switching control member (hereinafter, referred to as a projecting portion) are engaged with each other, and swinging of the switching lever causes the switching control member to swivel.

According to the above-described prior art, when seen in cross section, the anti-reverse device and the switching lever have a shape in which only an engagement portion (a portion in which the projecting portion and the cam are engaged with each other) projects radially outward. This has been disadvantageous in that a substantially C-shaped dead space is generated on an outer circumferential side of the anti-reverse device, resulting in a size increase of the fishing reel.

SUMMARY

The present invention has been devised to solve this problem and has as its object to provide a fishing reel configured to suppress formation of a dead space on an outer circumferential side of an anti-reverse device and thus reduced in size.

A fishing reel according to one embodiment of the present invention is provided with a reel body, a drive shaft caused to rotate by a handle operation, an anti-reverse device interposed between the reel body and the drive shaft, and a cylinder-shaped cylindrical member swivelably supported to the reel body and disposed on an outer circumferential side of the anti-reverse device. A switching control member of the anti-reverse device and the cylindrical member are engaged with each other, and a swiveling operation of the cylindrical member causes the drive shaft to switch to an anti-reverse state or a reversible state.

According to the foregoing invention, the cylindrical member and the switching control member are engaged with each other, and thus swiveling of the cylindrical member can cause switching between the anti-reverse state and the reversible state. In other words, the need for the conventionally used switching lever is eliminated, and thus no dead space is generated on the outer circumferential side of the anti-reverse device. This can achieve a size reduction of the fishing reel. Furthermore, according to the foregoing invention, in a case where the cylindrical member is formed to be elongated in an axial direction and covers the outer circumferential side of the anti-reverse device, it is less likely that seawater, dust, or the like enters the reverse rotation device. This suppresses degradation of smoothness or the like originating in the anti-reverse device and thus can maintain performance of the anti-reverse device for a long period of time. According to the conventional anti-reverse device, only the engagement portion in which the anti-reverse device and the switching lever are engaged with each other projects radially outward, and with such a shape, it is likely that a load attributable to a collision or the like acts only on the engagement portion. In contrast, according to the above-described embodiment of the present invention, the cylindrical member surrounds an outer circumference of the anti-reverse device. Thus, in the above-described embodiment of the present invention, it is possible to reduce a possibility that a load acts only on the engagement portion, causing a breakage of the engagement portion.

In one embodiment of the present invention, at least a part of the cylindrical member is exposed to an exterior so as to be operable.

According to the above-described embodiment, there is no need to form an operation knob, and thus the cylindrical member is simplified in shape, so that a manufacturing man-hour can be reduced.

In one embodiment of the present invention, the cylindrical member has an operation portion provided to extend from an end portion thereof to be exposed to the exterior.

According to the above-described embodiment, without the need to change the shape of a skirt portion of a rotor, which covers the outer circumferential side of the cylindrical member, the cylindrical member can be exposed to the exterior. That is, this configuration does not require a design modification of any other component and thus has excellent versatility.

In one embodiment of the present invention, the cylindrical member has a seal provided on an inner circumferential side of the cylindrical member. In one embodiment of the present invention, the anti-reverse device is disposed in a cylinder-shaped body front portion in the reel body, a magnetic fluid seal mechanism is provided in a front opening portion of the body front portion, and the seal mechanism seals a gap between the front opening portion and the drive shaft.

According to the above-described embodiment, it is possible to further reduce a possibility that seawater, dust, or the like enters the anti-reverse device.

In a fishing spinning reel, when a handle is operated to perform winding, a drive shaft supporting a rotor is driven (rotates). The drive shaft is assembled in a state where a front end thereof projects from a front opening portion of a reel body (a front body). In such a structure, seawater, sand, a foreign substance, or the like, upon entry thereof through the front opening portion of the front body, adheres to, for example, a ball bearing supporting the drive shaft, degrading rotation performance of the drive shaft. In order to avoid this, in the conventional fishing spinning reel, a seal member is provided in the front opening portion of the reel body.

Possible types of the seal member include, in addition to an elastic seal member formed of an elastic body, a magnetic fluid seal mechanism. The magnetic fluid seal mechanism is provided with a ring-shaped permanent magnet configured to orbit around the drive shaft, a pair of yoke plates holding the permanent magnet therebetween from an axial direction, a magnetic body fitted externally on the drive shaft, and a magnetic fluid disposed in a gap between the pair of yoke plates and the magnetic body and held by a magnetic force. For the sake of convenience of description, one of the pair of yoke plates that is disposed on a rear side (closer to the anti-reverse device) is referred to as a first yoke plate, and the other of the pair of yoke plates that is disposed on a front side is referred to as a second yoke plate.

By the way, in the fishing spinning reel provided with the magnetic fluid seal mechanism, there is a possibility that magnetic flux leaks to a component disposed in the vicinity of the magnetic fluid seal mechanism, for example, a bearing or the anti-reverse device. In order to avoid this, in a magnetic fluid seal mechanism described in Japanese Patent Application Publication No. 2011-155944, a first yoke plate is formed to be thicker in thickness than a second yoke plate. By this configuration, magnetic flux is concentrated on the first yoke plate, and thus magnetic flux leaking to an anti-reverse device side is reduced. Furthermore, in a magnetic fluid seal mechanism described in Japanese Patent Application Publication No. 2016-082918, a magnetic portion of the magnetic fluid seal mechanism and an inner ring of an anti-reverse device are formed as separate bodies, and thus magnetic flux leaking to the inner ring of the anti-reverse device is reduced. In a magnetic fluid seal mechanism described in Japanese Patent Application Publication No. 2012-019752, a gap in an axial direction between an outer circumferential edge of a first yoke plate and an outer circumferential edge of a second yoke plate is reduced in size, thus making it less likely that magnetic flux generated on an outer circumferential side of a permanent magnet leaks to an anti-reverse device side.

In each of the above-described conventional magnetic fluid seal mechanisms, however, an outer diameter of the first yoke plate is formed to be equal to or smaller than an outer diameter of the second yoke plate. Because of this, it has been a case that magnetic force lines on the outer circumferential side of the permanent magnet go around the periphery of the outer circumferential edge of the first yoke plate to extend to a rear side of the first yoke plate. That is, it has been a case that a lot of magnetic flux is distributed on a curve connecting the outer circumferential edge of the second yoke plate to a rear surface of the first yoke plate (a surface thereof facing the anti-reverse device). There has, therefore, been a possibility that magnetic flux leaks to the anti-reverse device side and magnetizes a roller of the anti-reverse device. As a result, there has been a possibility that the roller is magnetically attracted to the inner ring, causing torque loss when the drive shaft rotates and generating unusual noise (noise of the roller coming in contact with the inner ring).

In view of the above-described problem, another object of the present invention is to provide a fishing spinning reel capable of reducing magnetic flux leaking to an anti-reverse device side (a sealed member side).

In order to solve the foregoing problem, the fishing spinning reel is provided with a reel body configured to rotatably support a drive shaft projecting from a front opening portion, a sealed member made of a ferromagnetic material and interposed between the reel body and the drive shaft, and a magnetic fluid seal mechanism assembled in the front opening portion. The magnetic fluid seal mechanism is provided with a magnetic portion formed in the drive shaft, a ring-shaped permanent magnet disposed on an outer circumferential side of the magnetic portion, a first yoke plate and a second yoke plate both having a ring shape and disposed on axially opposite sides of the permanent magnet, and a magnetic fluid disposed in a gap between the magnetic portion and the first and second yoke plates and held by a magnetic force. The first yoke plate is provided closer to the sealed member compared with the second yoke plate and formed to be larger in outer diameter than the second yoke plate.

According to the foregoing invention, magnetic flux generated on an outer circumferential side of the permanent magnet comes to be mostly distributed on a curve connecting an outer circumferential edge of the second yoke plate to a front surface of the first yoke plate (a surface thereof facing an opposite side to the sealed member). In other words, magnetic flux distributed on a rear side (a sealed member side) of the first yoke plate is substantially reduced. Thus, in a case where the sealed member is the anti-reverse device, it becomes less likely that the roller is magnetically attracted to the inner ring, thus making it possible to reduce torque loss and also to suppress generation of unusual noise (noise of the roller coming in contact with the inner ring).

Furthermore, in the foregoing invention, preferably, the reel body is provided with a body front portion having the front opening portion formed therein, the sealed member is provided in the body front portion via the front opening portion, and the first yoke plate covers the front opening portion.

According to the foregoing configuration, it is possible to eliminate the need for a component used to cover the front opening portion of the body front portion, and thus the number of components can be reduced.

Furthermore, in the foregoing invention, preferably, the first yoke plate is provided with an annular outer circumferential portion secured to the body front portion, an annular intermediate portion extending from an inner circumferential edge of the outer circumferential portion in a direction away from the sealed member, and an annular inner circumferential portion continuous with an inner circumferential edge of the intermediate portion and configured to hold the permanent magnet.

According to the foregoing configuration, the permanent magnet held by the inner circumferential portion is separated from the anti-reverse device by the intermediate portion. Therefore, in a case where the sealed member is the anti-reverse device, magnetic flux leaking to the anti-reverse device side is further reduced, thus making it possible to further reduce torque loss and also to reliably suppress generation of unusual noise (noise of the roller coming in contact with the inner ring).

Furthermore, in the foregoing invention, it may also be possible that the sealed member is the anti-reverse device or a bearing.

Furthermore, in the foregoing invention, preferably, there is provided a cylindrical member rotationally supported to the reel body and disposed on an outer circumferential side of the body front portion, the sealed member is the anti-reverse device, a switching control member of the anti-reverse device and the cylindrical member are engaged with each other, and a rotational operation of the cylindrical member causes the drive shaft to switch between an anti-reverse state and a reversible state.

According to the foregoing configuration, the need for the conventionally used switching lever is eliminated, and thus a size reduction of the fishing spinning reel can be achieved. Furthermore, according to the foregoing invention, the cylindrical member covers the outer circumferential side of the anti-reverse device, and thus it is less likely that seawater, dust, or the like enters the anti-reverse device. This suppresses degradation of smoothness or the like originating in the anti-reverse device and thus can maintain performance of the anti-reverse device for a long period of time.

Furthermore, in the foregoing invention, preferably, there is provided an elastic seal member formed of an elastic material and fitted on a circumferentially outer side of the permanent magnet so as to seal a clearance between the magnetic fluid seal mechanism and the front opening portion of the cover member, the second yoke plate projects radially outward beyond an outer circumferential surface of the permanent magnet, and the elastic seal member is held between the first yoke plate and the second yoke plate.

According to the foregoing configuration, there is no need to separately prepare a configuration for securing the elastic seal member, and thus the number of components can be reduced.

ADVANTAGES

According to one embodiment of the present invention, it is possible to provide a fishing reel configured to suppress formation of a dead space on the outer circumferential side of the anti-reverse device and thus reduced in size.

According to another embodiment of the present invention, it is possible to provide a fishing spinning reel capable of reducing magnetic flux leaking to the anti-reverse device side.

DESCRIPTION OF THE PREFERRED EMBODIMENTS

By referring to the appended drawings as appropriate, a description is given of a fishing spinning reel to which an embodiment of the present invention is applied. In the description of the embodiment, "upper/lower", "front/rear", and "left/right" refer respectively to directions corresponding thereto shown in FIG. 1.

(Fishing Spinning Reel)

Figure 1:
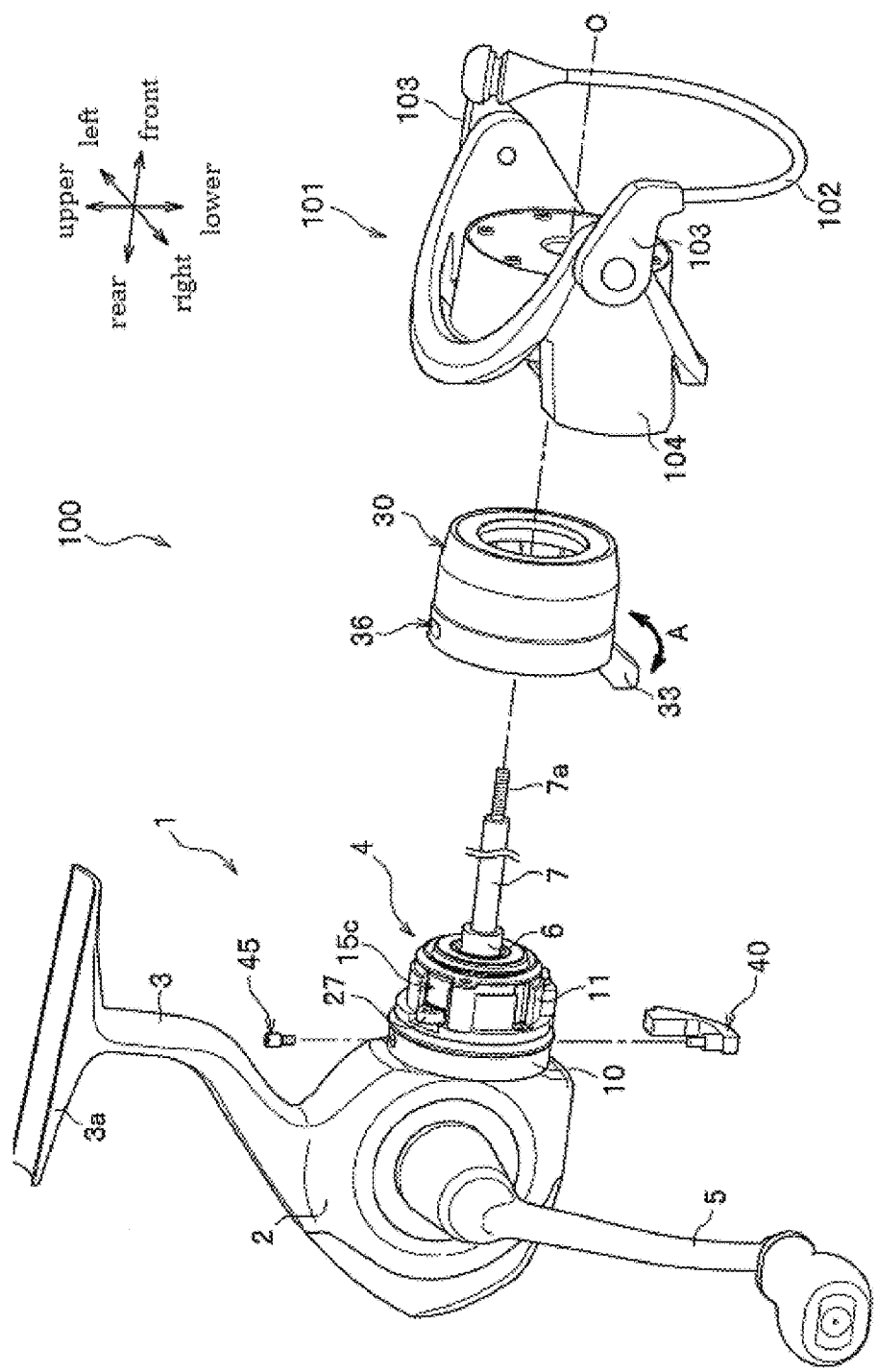
FIG. 1 is an exploded perspective view of a fishing spinning reel as a fishing reel of this embodiment.

As shown in FIG. 1, a fishing spinning reel 100 may be provided with a reel body 1, a rotor 101, and a spool (not shown). A drive shaft cylinder 6 that is a drive shaft and a spool shaft 7 may be assembled in the reel body 1. The spool shaft 7 may be assembled so as to project forward. The rotor 101 may be provided at a front portion of the drive shaft cylinder 6 rotatably about an axis line O. The spool may be mounted at a front portion 7a of the spool shaft 7 so as to reciprocate along the axis line O.

(Reel Body)

The reel body 1 may be provided with a body 2 having a handle 5 mounted thereto, a leg portion 3 extending upward from an upper portion of the body 2, and a cylinder-shaped body front portion 4 positioned on a front side of the body 2. A rod mounting portion 3a to be mounted to a fishing rod (not shown) may be provided at a distal end of the leg portion 3. The body front portion 4 may be penetrated through by the drive shaft cylinder 6 and the spool shaft 7.

(Body)

Figure 3:
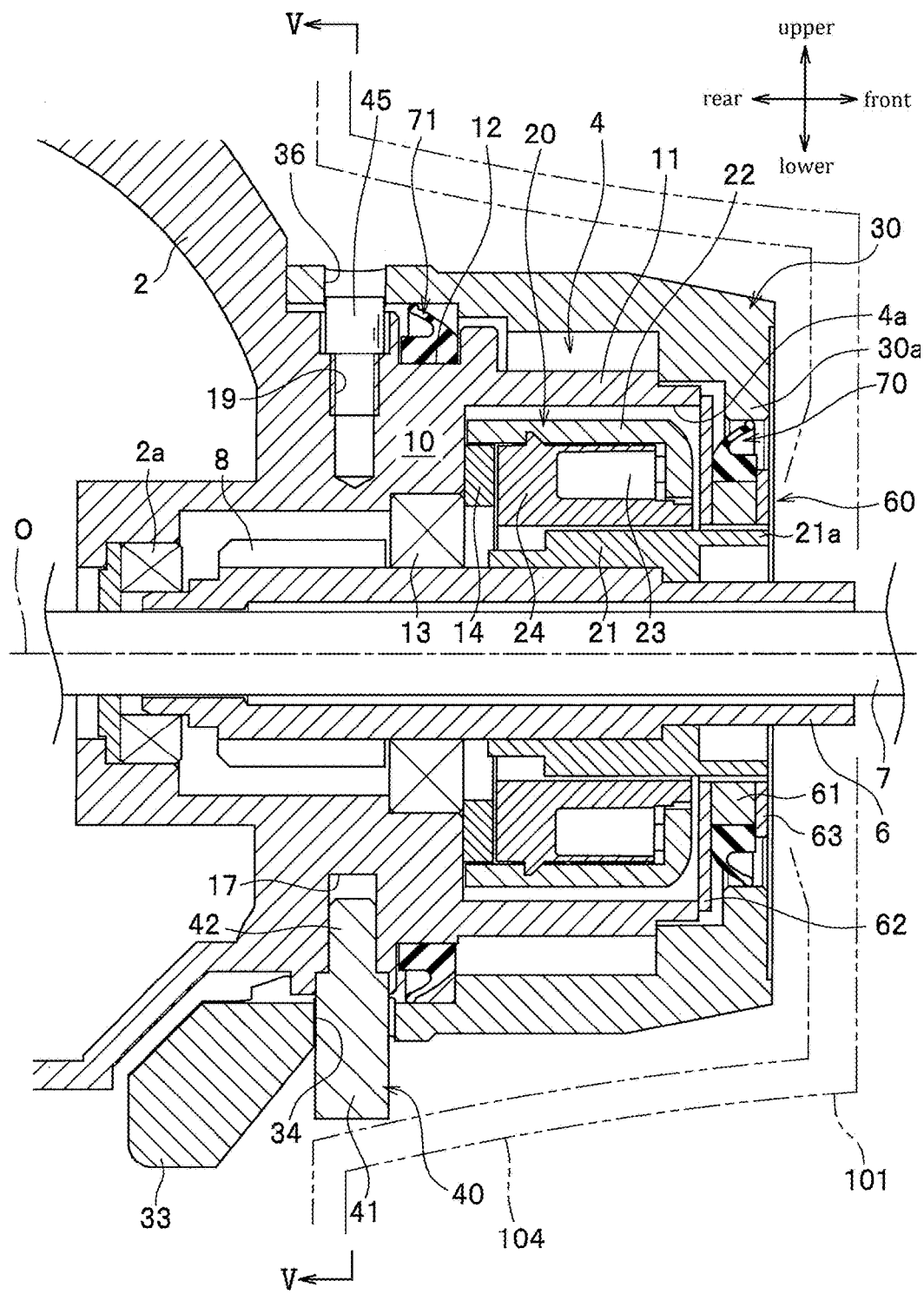
FIG. 3 is a sectional view of the body front portion.

The body 2 may store therein, as a configuration for driving the drive shaft cylinder 6 and the spool shaft 7 by a winding operation of the handle 5, a handle shaft coupled to the handle 5, a drive gear and a gear coupled to said handle shaft, and a known spool reciprocation device meshed with said gear, though depictions thereof are omitted. A pinion 8 (see FIG. 3) of the drive shaft cylinder 6 may be meshed with said drive gear. By this configuration, the drive shaft cylinder 6 may be caused to rotate about the axis line O by a winding operation of the handle 5. A rear end portion of the spool shaft 7 may be mounted to said spool reciprocation device. By this configuration, the spool shaft 7 may be caused to reciprocate along the axis line O by a winding operation of the handle 5. As shown in FIG. 3, in the body 2, there may be provided a rear portion bearing 2a for rotatably supporting a rear end portion of the drive shaft cylinder 6.

(Body Front Portion)

Figure 2:
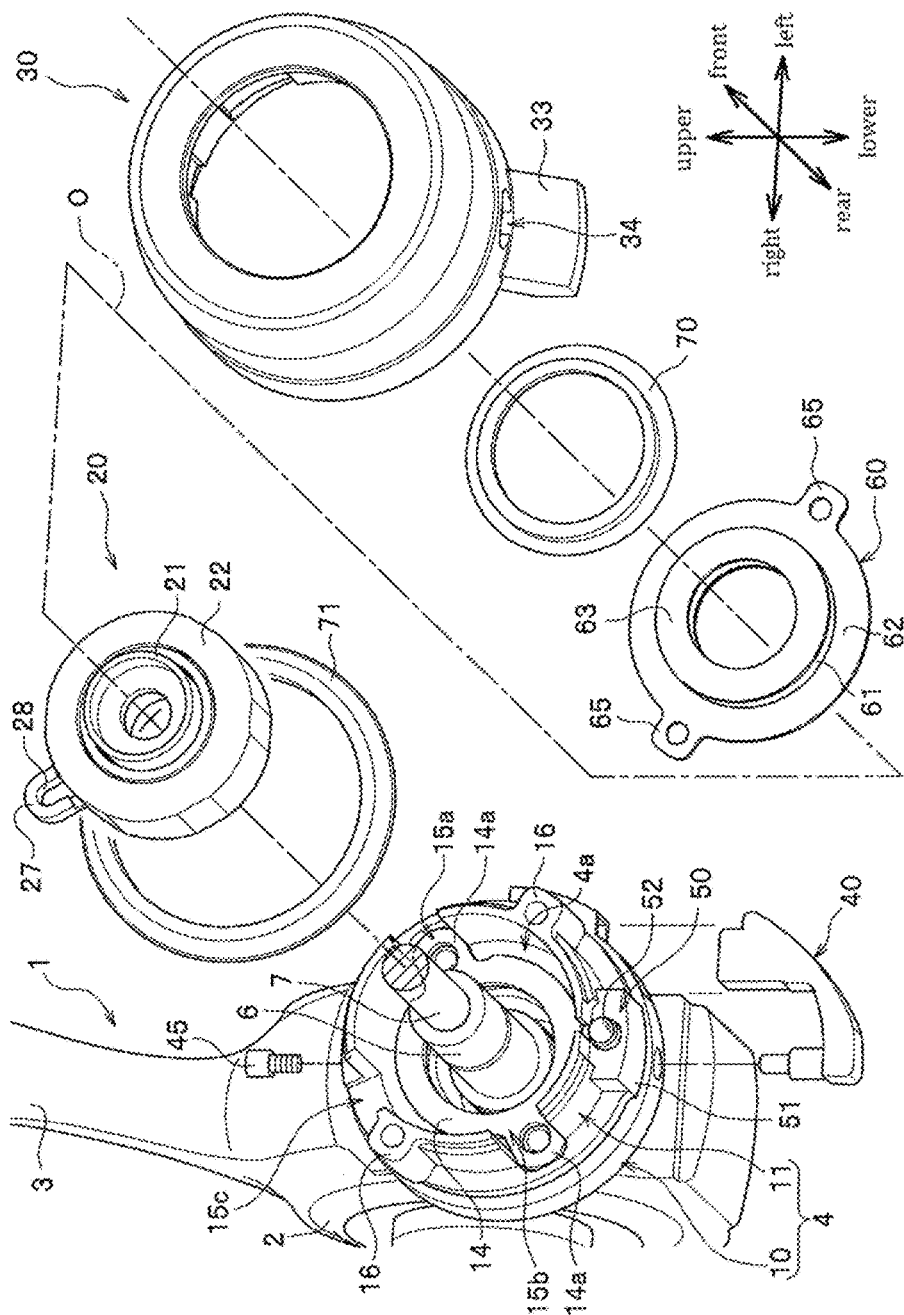
FIG. 2 is an exploded perspective view of a body front portion and components assembled in the body front portion.

As shown in FIG. 2, the body front portion 4 may be formed in a substantially circular cylindrical shape about the axis line O. Furthermore, the body front potion 4 may be formed to have a diameter smaller in a front portion thereof than in a rear portion thereof. Hereinafter, a rear side of the body front portion 4 is referred to as a large diameter portion 10 and a front side thereof is referred to as a small diameter portion 11. In the body front portion 4 (the large diameter portion 10 and the small diameter portion 11), an anti-reverse device 20, an operation cover 30, an engagement portion 40 of a bail inversion mechanism, a swiveling position retaining tool 50, a magnetic fluid seal mechanism 60, a front seal 70, and a rear seal 71 may be assembled. The following describes details of the body front portion 4 (the large diameter portion 10 and the small diameter portion 11) and the various components.

(Large Diameter Portion)

As shown in FIG. 3, a circumferential grove 12 extending in a circumferential direction may be formed on an outer circumferential surface of the large diameter portion 10. An intermediate bearing 13 for supporting a middle portion of the drive shaft cylinder 6 in a front-rear direction may be fitted internally on an inner circumferential surface of the large diameter portion 10. In order to prevent the intermediate bearing 13 from falling off the large diameter portion 10, an outer ring of the intermediate bearing 13 is in contact with a ring member 14. As shown in FIG. 2, each of flange portions 14a of the ring member 14 may be fastened using an unshown bolt so that the ring member 14 is secured to the large diameter portion 10.

(Small Diameter Portion)

The small diameter portion 11 may be a part for storing therein the anti-reverse device 20 (see FIG. 3). As shown in FIG. 2, in the small diameter portion 11, three cutouts, i.e. a first cutout 15a, a second cutout 15b, and a third cutout 15c may be formed. The first cutout 15a, the second cutout 15b, and the third cutout 15c may be formed by cutting out the small diameter portion 11 from a front end toward a rear side thereof. The flange portions 14a of the ring member 14 may be arranged in the first cutout 15a and the second cutout 15b, respectively. The first cutout 15a may be provided on an upper left side with respect to the axis line O, and the second cutout 15b may be provided on a lower right side with respect to the axis line O. In order for an after-mentioned projecting portion 27 of the anti-reverse device 20 to be disposed on an outer circumferential side of the small diameter portion 11 (see FIG. 1 and FIG. 4), the third cutout 15c may be provided on an upper right side with respect to the axis line O. On the outer circumferential side of the small diameter portion 11, there may be formed two bolt securing portions 16 each having a female screw portion formed on a front end surface thereof.

(Reverse Rotation Preventive Device)

The anti-reverse device 20 may be a known device configured to permit rotation of the drive shaft cylinder 6 in one direction, while preventing rotation thereof in the other direction (hereinafter, referred to as "reverse rotation". As shown in FIG. 3, the anti-reverse device 20 may be provided with an inner ring 21 fitted on an outer circumferential side of the drive shaft cylinder 6 and unrotatably secured thereto, an outer ring 22 inserted into the small diameter portion 11 and unrotatably secured thereto, a plurality of rollers 23 disposed between the inner ring 21 and the outer ring 22, and a retainer (a switching control member) 24.

The inner ring 21 may be formed of a magnetic material. Furthermore, the inner ring 21 may extend forward with respect to the outer ring 22, and a front portion of the inner ring 21 may constitute a magnetic portion of the magnetic fluid seal mechanism 60. Hereinafter, the front portion of the inner ring 21 is referred to as a magnetic portion 21a.

Figure 4:
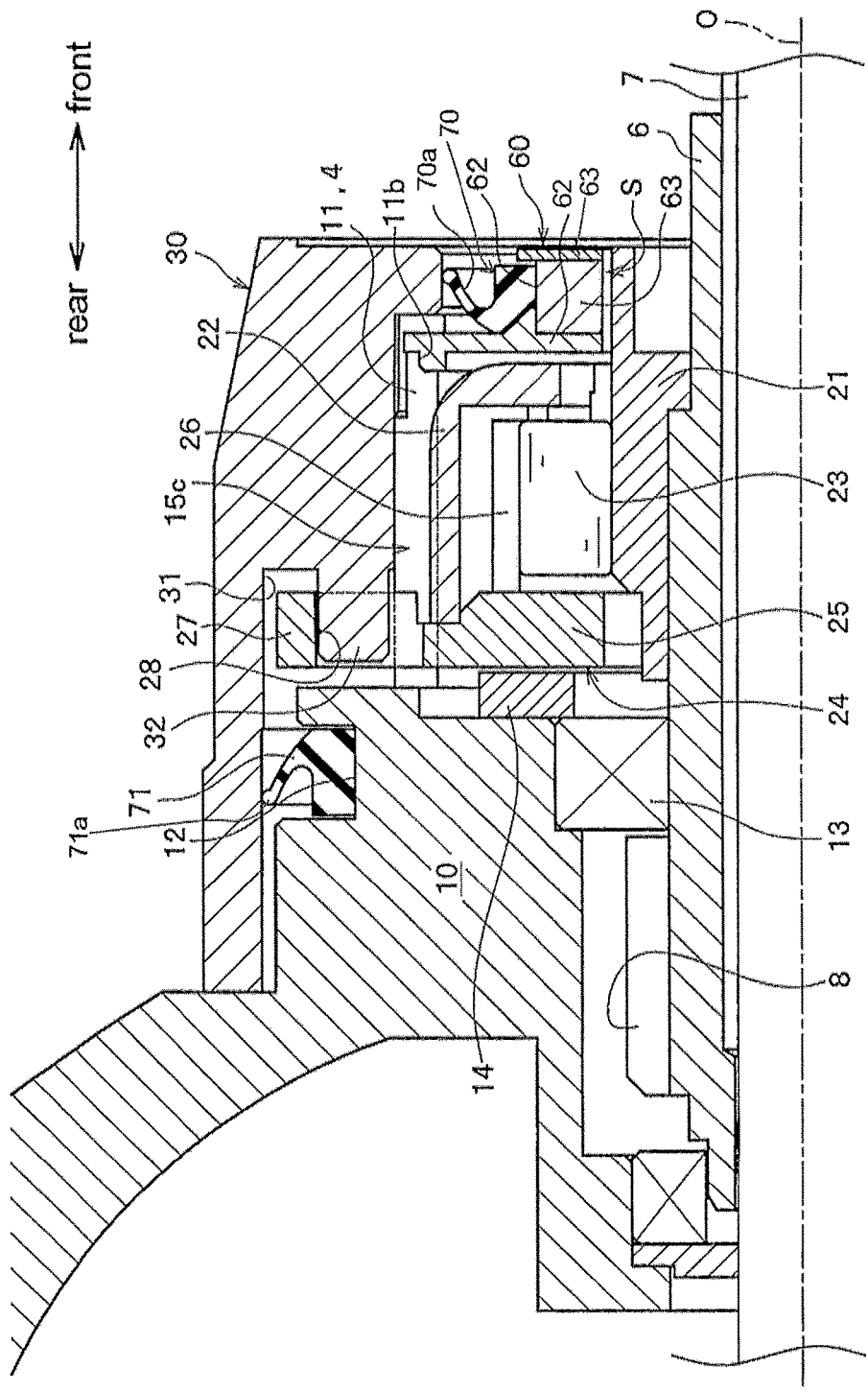
FIG. 4 is a sectional view of the body front portion cut from an axis line thereof toward a third cutout.

As shown in FIG. 4, the retainer 24 may be provided with an annular portion 25 having an annular shape and disposed on a rear side of the plurality of rollers 23, a plurality of extension portions 26 extending from the annular portion 25 to between the rollers 23, and a projecting portion 27 projecting radially outward from an outer circumferential surface of the annular portion 25.

The projecting portion 27 may be provided so as to be displaceable (movable) in the circumferential direction. When the projecting portion 27 is displaced in the circumferential direction, the extension portions 26 may also be displaced in the circumferential direction together with the projecting portion 27. Further, the rollers 23 pressed by the extension portions 26 may also be displaced in the circumferential direction. Accordingly, depending on a position of the projecting portion 27 in the circumferential direction, the rollers 23 may exert a wedge action between the inner ring 21 and the outer ring 22, thus preventing reverse rotation of the inner ring 21 (the drive shaft cylinder 6), or the rollers 23 may exert no wedge action between the inner ring 21 and the outer ring 22, thus permitting reverse rotation of the inner ring 21 (the drive shaft cylinder 6). As described in, for example, Japanese Patent Application Publication No. 2004-350614, Japanese Patent Application Publication No. 2007-267707, and so on, a mechanism for switching between permission and prohibition of reverse rotation is known, and a detailed description thereof is, therefore, omitted.

The projecting portion 27 may be configured to pass through the third cutout 15c of the small diameter portion 11, with a distal end portion thereof extending radially outward with respect to the small diameter portion 11. The third cutout 15c may be formed to have a width (a length in the circumferential direction) wide enough to allow the projecting portion 27 to be displaced in the circumferential direction. In the distal end portion of the projecting portion 27, there may be formed an ellipsoidal circular hole 28 penetrating through the projecting portion 27 in the front-rear direction (see FIG. 2).

(Operation Cover)

As shown in FIG. 3, the operation cover 30 may be a circular cylindrical member surrounding an outer circumferential side of the body front portion 4 (the large diameter portion 10 and the small diameter portion 11). Thus, the body front portion 4 may be covered with the operation cover 30 so that it is less likely that seawater or the like adheres to the anti-reverse device 20 in the small diameter portion 11. On an outer circumferential side of the operation cover 30, a skirt portion 104 of the rotor 101 may be disposed. In a front end portion of the operation cover 30, an annular projecting portion 30a projecting radially inward may be formed. The operation cover 30 may be partially in contact at an inner circumferential surface thereof with an outer circumferential surface of the body front portion 4 and assembled slidably (swivelably) in the circumferential direction with respect to the body front portion 4. As shown in FIG. 4, on the inner circumferential surface of the operation cover 30, at a part opposed to the third cutout 15c of the small diameter portion 11, a concave 31 for housing the projecting portion 27 of the retainer 24 may be formed. In the concave portion 31, there may be formed an engagement portion 32 having a cylindrical column shape and inserted into the circular hole 28 of the projecting portion 27 so that the operation cover 30 and the projecting portion 27 are engaged with each other in the circumferential direction. Thus, when the operation cover 30 swivels, the retainer 24 also swivels in the same direction as a swiveling direction of the operation cover 30. That is, according to this embodiment, by operating the operation cover 30 to swivel, a fisherman can perform switching of the anti-reverse device 20 between a reverse operation preventive state and a reverse operation permissive state.

As shown in FIG. 3, on a lower side of a rear end portion of the operation cover 30, there may be formed an operation knob 33 extending rearward and exposed from the skirt portion 104 of the rotor 101. Thus, by grasping the operation knob 33 and moving it in the circumferential direction (see an arrow A in FIG. 1), a fisherman can cause the operation cover 30 to swivel.

(Engagement Portion of Bail Inversion Mechanism)

As shown in FIG. 3, the engagement portion 40 of the bail inversion mechanism may be provided on a lower side of a rear end portion of the operation cover 30. The engagement portion 40 of the bail inversion mechanism may be a member configured so that, in a case where the rotor 101 rotates in a winding direction in a state where a bail 102 (see FIG. 1) is in a fishing line reeling-out position, the member comes in contact with a returning contact member (not shown) provided on an inner circumferential side of an arm 103 (see FIG. 1), thus causing the bail 102 to be inverted (returned to a fishing line winding position). The bail 102 shown in FIG. 1 is in a state of being in the fishing line winding position.

Figure 5:
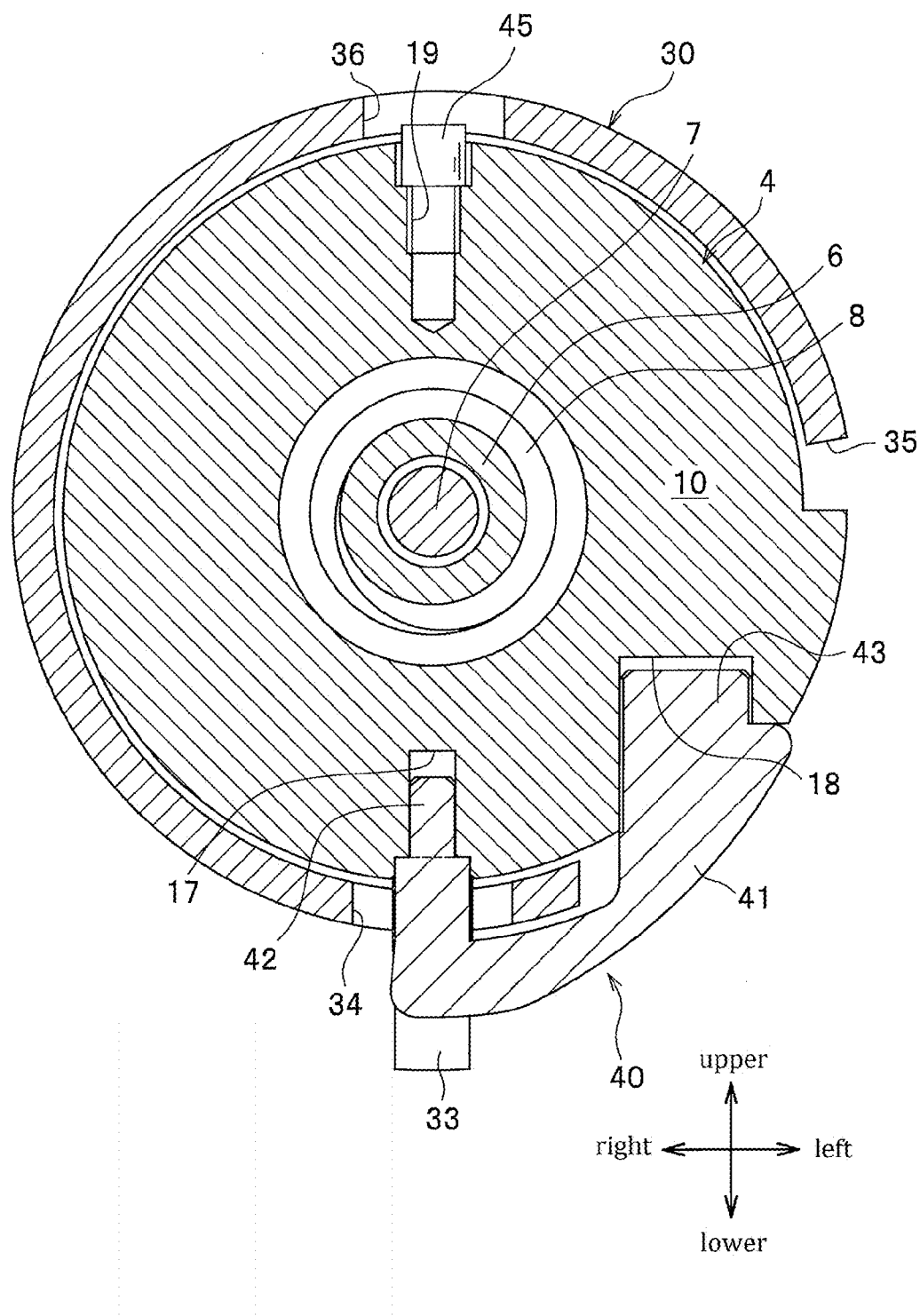
FIG. 5 is a sectional view taken along line V-V indicated by arrows in FIG. 3.

As shown in FIG. 5, the engagement portion 40 may be provided with a main body portion 41 having a circular arc shape and configured to come in contact with the returning contact member (not shown) and a first leg portion 42 and a second leg portion 43 extending radially inward from an inner circumferential surface of the main body portion 41 and inserted respectively into mounting holes 17 and 18 of the body front portion 4 (the large diameter portion 10).

In the operation cover 30, there may be formed a first leg portion through hole 34 for the first leg portion 42 to penetrate therethrough and a cutout 35 for the second leg portion 43 to penetrate therethrough. Each of the first leg portion through hole 34 and the cutout 35 may be formed to be wide in the circumferential direction so that, when the operation cover 30 swivels, the first leg portion 42 and the second leg portion 43 do not interfere with each other. Furthermore, as shown in FIG. 3, the first leg portion 42 of the engagement portion 40 penetrates through the first leg portion through hole 34, and thus movement of the operation cover 30 in the front-rear direction may be restricted by the first leg portion 42. By this configuration, the operation cover 30 can be prevented from falling off the body front portion 4.

On an upper side of the rear end portion of the operation cover 30, an upper portion through hole 36 radially penetrating through the operation cover 30 may be formed. In the upper portion through hole 36, there may be disposed a coming-off stopping member 45 screwed with a female screw portion 19 of the body front portion 4. The coming-off stopping member 45 may be in contact with (slide along) an inner surface of the upper portion through hole 36. This may make it less likely that the operation cover 30 rattles in the front-rear direction.

(Swiveling Position Retaining Tool)

The swiveling position retaining tool 50 may be a member for retaining a position of the operation cover 30 in the circumferential direction in the anti-reverse state or in the reversible state. As shown in FIG. 2, the swiveling position retaining tool 50 may be provided with a wall portion 51 formed on the outer circumferential side of the small diameter portion 11, a pin 52 fitted into a hole (not shown) formed through a front surface of the wall portion 51 movably in the front-rear direction, and a compression coil spring (not shown) biasing the pin 52 forward. A front end of the pin 52 may be fitted into a concave portion (not shown) formed on a rear surface of the projecting portion 30a of the operation cover 30. Two of such concave portions on the rear surface of the projecting portion 30a may be formed side by side in the circumferential direction. In a case where the operation cover 30 is in the anti-reverse state, the pin 52 may be fitted into one of the concave portions, and in a case where the operation cover 30 is in the reverse rotation permissible state, the pin 52 may be fitted into the other concave portion. Thus, the operation cover 30 may be retained in the anti-reverse state or in the reversible state.

(Magnetic Fluid Seal Mechanism)

Figure 6:
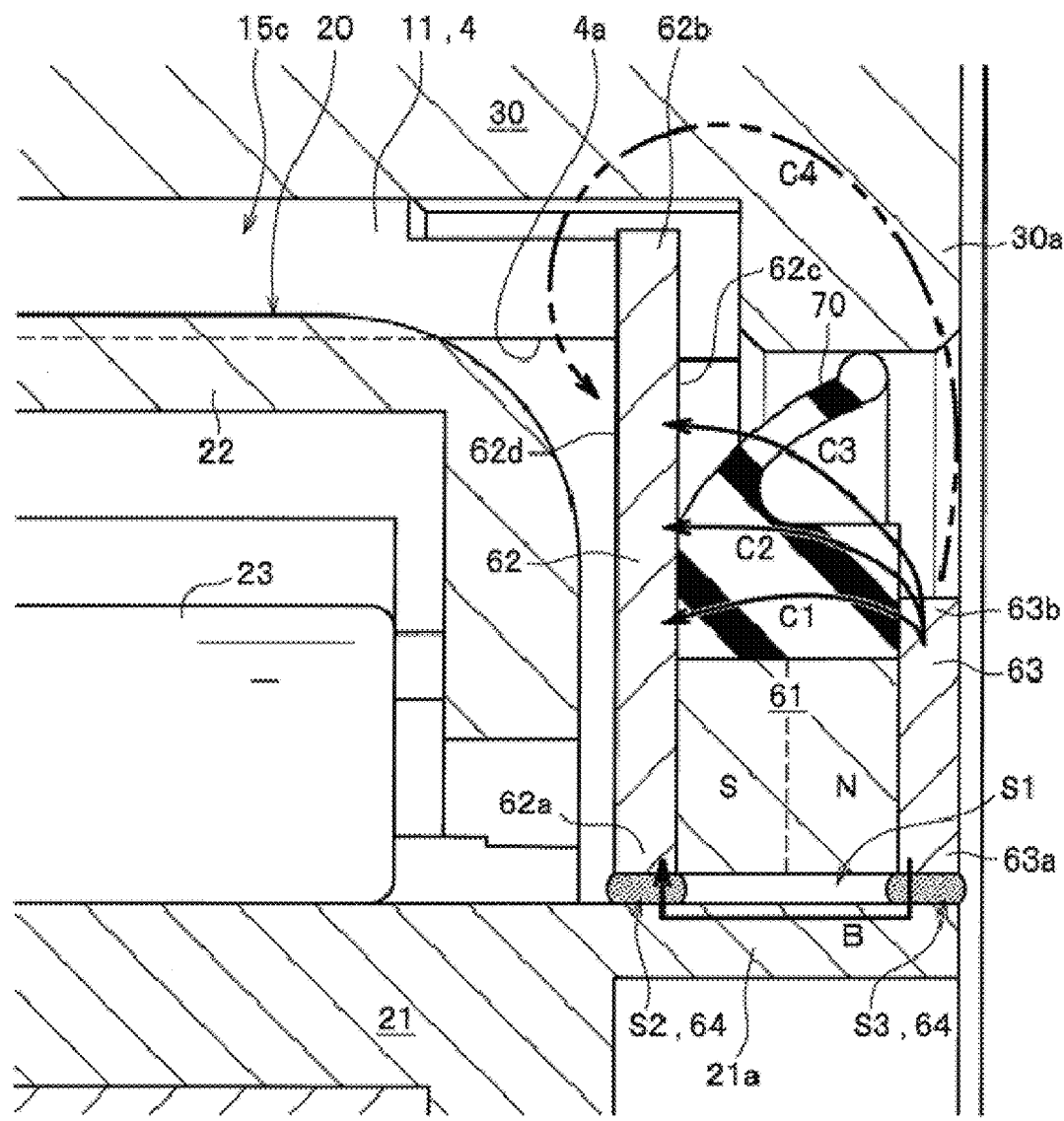
FIG. 6 is a sectional enlarged view of a cross section of a magnetic fluid seal mechanism shown in FIG. 4.

As shown in FIG. 6, the magnetic fluid seal mechanism 60 may be provided with a ring-shaped permanent magnet 61, a pair of yoke plates 62 and 63 both having a ring shape and disposed respectively on both of front and rear sides of the permanent magnet 61, a magnetic portion 21a formed integrally with the inner ring 21 of the anti-reverse device 20, and a magnetic fluid 64 held between the magnetic portion 21a and the pair of yoke plates 62 and 63. The permanent magnet 61 and the pair of yoke plates 62 and 63 may be formed integrally by using an adhesive. One of the pair of yoke plates 62 and 63 that is disposed on a rear side (an anti-reverse device 20 side) of the permanent magnet 61 is referred to as a first yoke plate 62, and the other of the pair of yoke plates 62 and 63 that is disposed on a front side of the permanent magnet 61 is referred to as a second yoke plate 63.

The permanent magnet 61 may have such an orientation that a front surface side thereof is a north pole and a rear surface side thereof is a south pole. Therefore, in the magnetic fluid seal mechanism 60, an inner circumferential side magnetic circuit (see an arrow B in FIG. 6) and an outer circumferential side magnetic circuit (see arrows C1 to C3 in FIG. 6) may be formed from a front surface toward a rear surface of the permanent magnet 61. An inner diameter of the permanent magnet 61 may be slightly larger than an outer diameter of the magnetic portion 21a, so that a narrow gap S1 may be formed between the permanent magnet 61 and the magnetic portion 21a.

Each of the first yoke plate 62 and the second yoke plate 63 may be formed of a material having a high magnetic permeability and be a component for concentrating magnetic flux generated from the permanent magnet 61, thus forming a magnetic circuit. Furthermore, the first yoke plate 62 and the second yoke plate 63 may be both equal in inner diameter to the permanent magnet 61. Therefore, a narrow gap S2 may be formed between the first yoke plate 62 and the magnetic portion 21a. Furthermore, a narrow gap S3 may be formed also between the second yoke plate 63 and the magnetic portion 21a. Further, a magnetic fluid 64 may be filled in each of the gaps S2 and S3. The magnetic fluid 64 may be formed by dispersing magnetic fine particles such as, for example, of $Fe_3O_4$ in base oil.

With the configuration thus described, magnetic flux generated on an inner circumferential side of the permanent magnet 61 may be distributed in such a manner as to be concentrated on an inner circumferential end 63a of the second yoke plate 63, the magnetic portion 21a, and an inner circumferential end 62a of the first yoke plate 62, forming a magnetic circuit indicated by the arrow B in FIG. 6. Therefore, a large magnetic force may be acting on each of the gaps S2 and S3, and thus the magnetic fluid filled in each of the gaps S2 and S3 may be retained for a long period of time without flowing out. As a result, an extremely high sealing property may be provided between the magnetic fluid seal mechanism 60 and the drive shaft cylinder 6.

The first yoke plate 62 and the second yoke plate 63 may be both formed to be larger in outer diameter than the permanent magnet 61. In other words, the first yoke plate 62 and the second yoke plate 63 may project radially outward with respect to an outer circumferential surface of the permanent magnet 61.

The first yoke plate 62 may be formed to be larger in outer diameter than the second yoke plate 63. Thus, as indicated by the arrows C1, C2, and C3 in FIG. 6, magnetic flux generated on an outer circumferential side of the permanent magnet 61 may be distributed in such a manner as to be concentrated on a curve connecting a front surface 62c of the first yoke plate 62 to an outer circumferential edge 63b of the second yoke plate 63. That is, magnetic flux (leakage magnetic flux) going around an outer circumferential edge 62b of the first yoke plate 62 and distributed on a curve (see an arrow C4 shown by a chain double-dashed line) connecting a rear surface 62d of the first yoke plate 62 to the outer circumferential edge 63b of the second yoke plate 63 may be reduced. Thus, magnetization of a roller 23 of the anti-reverse device 20, which is disposed on a rear side of the first yoke plate 62, may be suppressed.

Furthermore, the first yoke plate 62 may be formed to be slightly larger in outer diameter than the anti-reverse device 20. According to this configuration, while reducing magnetic flux leaking to the anti-reverse device 20 side, it is possible to avoid a size increase of the magnetic fluid seal mechanism 60.

As shown in FIG. 2, the first yoke plate 62 may have a pair of flange portions 65 formed to project to opposite sides to each other with respect to the axis line O. Each of the flange portions 65 may be fastened using a bolt (not shown) screwed with each of the bolt securing portions 16 of the small diameter portion 11 so that the magnetic fluid seal mechanism 60 is secured to the small diameter portion 11. Further, the first yoke plate 62 may be disposed in a state of being in contact with a front end surface of the small diameter portion 11, thus closing a front opening portion 4a of the body front portion 4. Therefore, according to the magnetic fluid seal mechanism 60 of the embodiment, it is possible to eliminate the need for a member used to close the front opening portion 4a of the body front portion 4 (the large diameter portion 10 and the small diameter portion 11), and thus the number of components can be reduced. Next, a description is given of the front seal 70 and the rear seal 71. As shown in FIG. 4, each of the front seal 70 and the rear seal 71 may have an annular shape and be an elastic seal member formed of an elastic material. In the front seal 70 and the rear seal 71, radially projecting lip portions 70a and 71a may be formed, respectively.

The front seal 70 may be fitted on the outer circumferential surface of the permanent magnet 61 of the magnetic fluid seal mechanism 60. In a state of pressing an inner circumferential surface of the projecting portion 30a of the operation cover 30 radially outward, the lip portion 70a of the front seal 70 may be in contact therewith. Furthermore, the front seal 70 may be held from the front-rear direction between an outer circumferential portion of the first yoke plate 62 and an outer circumferential portion of the second yoke plate 63. Thus, the front seal 70 may be held without falling off the permanent magnet 61. The rear seal 71 may be fitted in a circumferential groove 12 of the large diameter portion 10. In a state of pressing the inner circumferential surface of the operation cover 30 radially outward, the lip portion 71a of the rear seal 71 may be in contact therewith. The front seal 70 and the rear seal 71 may make it less likely that seawater or the like enters between the operation cover 30 and the small diameter portion 11. Therefore, seawater or the like is prevented from adhering to the anti-reverse device 20 in the small diameter portion 11 via the first cutout 15a to the third cutout 15c.

According to the above-described embodiment, the operation cover 30 surrounding an outer circumferential side of the anti-reverse device 20 may constitute an operation member configured to perform switching between the anti-reverse state and the reversible state, thus eliminating the need for the conventionally used switching lever. Thus, in the fishing spinning reel 100 of this embodiment, a substantially C-shaped dead space, which is conventionally formed on the outer circumferential side of the anti-reverse device 20, may not be formed. Therefore, a cover member (the operation cover 30) covering the body front portion 4 and the skirt portion 104 of the rotor 101 can be reduced in size, and thus a size reduction of the fishing spinning reel 100 can be achieved.

According to the embodiment of the present invention, the projecting portion 27 of the anti-reverse device 20 may be covered with the operation cover 30, and thus concentration of a load on said projecting portion 27 can be avoided.

According to the above-described embodiment, magnetic flux leaking to the anti-reverse device 20 side may be hardly generated, and thus it is less likely that the roller 23 is magnetically attracted to the inner ring 21, so that torque loss can be avoided. Furthermore, generation of noise of the roller 23 coming in contact with the inner ring 21 (unusual noise) can also be avoided.

According to the above-described embodiment, the first yoke plate 62 may cover the front opening portion 4a of the body front portion 4, and thus the need for a component used to cover the front opening portion 4a of the body front portion 4 may be eliminated, so that the number of components can be reduced.

While the foregoing has described various embodiments of the present invention, the embodiments described in this specification are merely illustrative. Therefore, the present invention is not limited to the embodiments described in this specification.

For example, the operation cover 30 of the embodiment may be covered with the skirt portion 104 of the rotor 101, and thus the operation knob 33 may be formed so that the operation cover 30 is operable using the operation knob 33. A configuration, however, may also be possible in which the operation cover 30 is exposed from the skirt portion 104. According to such a modification example, there may be no need to form the operation knob 33 in the operation cover 30. Therefore, the operation cover 30 may be simplified in shape, and thus a manufacturing man-hour can be reduced.

In the embodiment, as a configuration for engaging the retainer (the switching control member) 24 with the operation cover (the cylindrical member) 30 in the circumferential direction, the projecting portion 27 having the circular hole 28 formed therethrough may be formed in the retainer 24, and the engagement portion 32 may be formed in the operation cover 30. The present invention, however, is not limited thereto. For example, it may also be possible that the projecting portion 27 is formed in the operation cover 30 and the engagement portion 32 is formed in the retainer 24. Furthermore, it may also be possible that a concave portion concaved radially inward is formed on an outer circumferential surface of the retainer 24 (the annular portion 25) and a convex portion to be fitted into the concave portion is formed on the inner circumferential surface of the operation cover 30. Also according to such a modification example, swiveling of the operation cover 30 may cause the convex portion to press an inner surface of the concave portion in the circumferential direction, thus being able to cause the retainer 24 to swivel.

Furthermore, the operation cover 30 of the embodiment may have a shape elongated in the front-rear (the axis line O) direction, covering the outer circumferential side of the small diameter portion 11. The present invention, however, is not limited thereto. That is, the cylindrical member (the operation cover 30) of the present invention may only be required to be engageable with the projecting portion 27, and thus it may also be possible that the cylindrical member is formed to be shorter in the front-rear (the axis line O) direction. It may also be possible that the present invention is applied to a fishing reel of any other type than a fishing spinning real.

While in the above-described embodiment, the magnetic portion 21a may be formed integrally with the inner ring of the anti-reverse device 20, the magnetic portion in the present invention is not limited thereto, and it may also be possible that these are formed as separate bodies. Furthermore, it may also be possible that the drive shaft cylinder 6 itself is formed of a ferromagnetic material so as to be configured as the magnetic portion. Thus, a function of the magnetic portion 21*a* can be imparted to the drive shaft cylinder 6.

While in the above-described embodiment, the first yoke plate 62 may be configured to extend linearly from an inner circumferential edge toward an outer circumferential edge thereof so as to be flat plate-shaped, there is no limitation thereto. For example, it may also be possible that the part of the first yoke plate 62, which projects radially outward with respect to the outer circumferential surface of the permanent magnet 61, is bent or curved.

Figure 7:
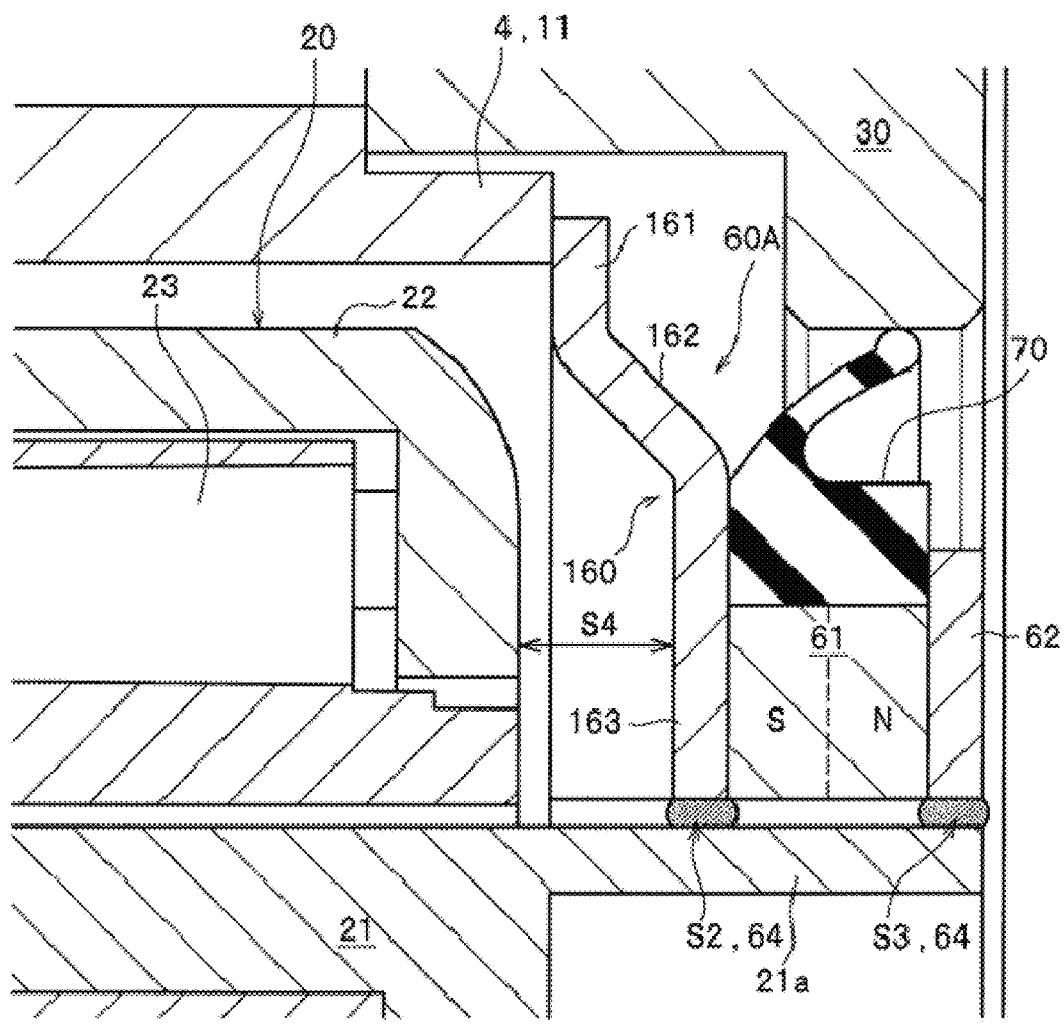
FIG. 7 is a sectional enlarged view of a cross section of a magnetic fluid seal mechanism according to a modification example.

As shown in FIG. 7, it may also be possible that the first yoke plate 160 is provided with an annular outer circumferential portion 161 secured to the body front portion 4 and being in contact with an end surface of the small diameter portion 11, an annular intermediate portion 162 inclined from an inner circumferential edge of the outer circumferential portion 161 in a direction (forward) away from the anti-reverse device 20, and an annular inner circumferential portion 163 continuous with an inner circumferential edge of the intermediate portion 162 and configured to hold the permanent magnet 61. According to this configuration, a gap S4 can be formed between the magnetic fluid seal mechanism 60A (the first yoke plate 160) and the anti-reverse device 20, and thus the permanent magnet 61 can be disposed forward away from the anti-reverse device 20. As a result, it may be even less likely that magnetic flux leaks to the anti-reverse device 20 side, and thus torque loss and generation of noise can be more reliably avoided.

EXAMPLES

Figure 8:
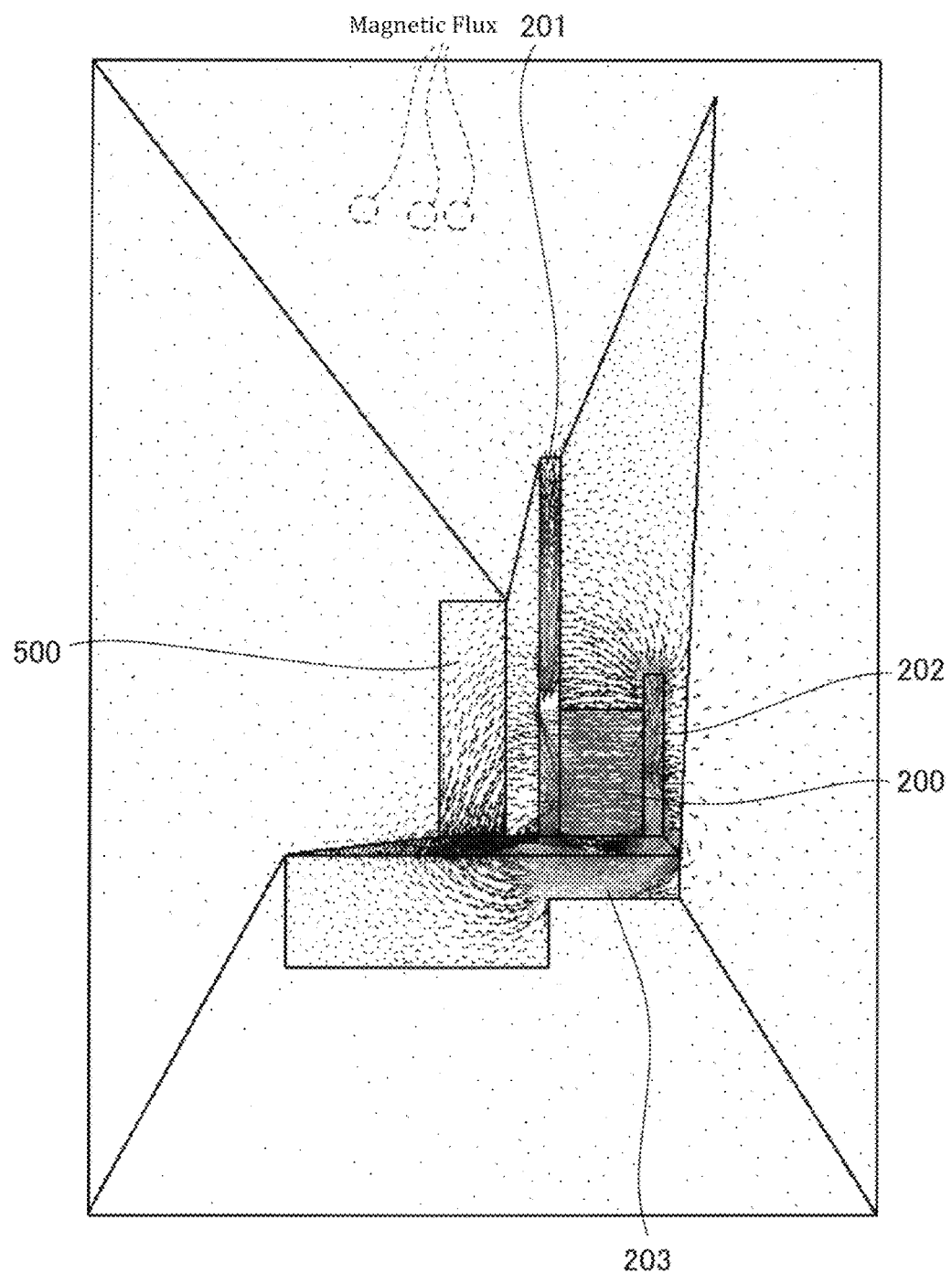
FIG. 8 is a view showing a result of magnetic field analysis of Example 1.
Figure 9:
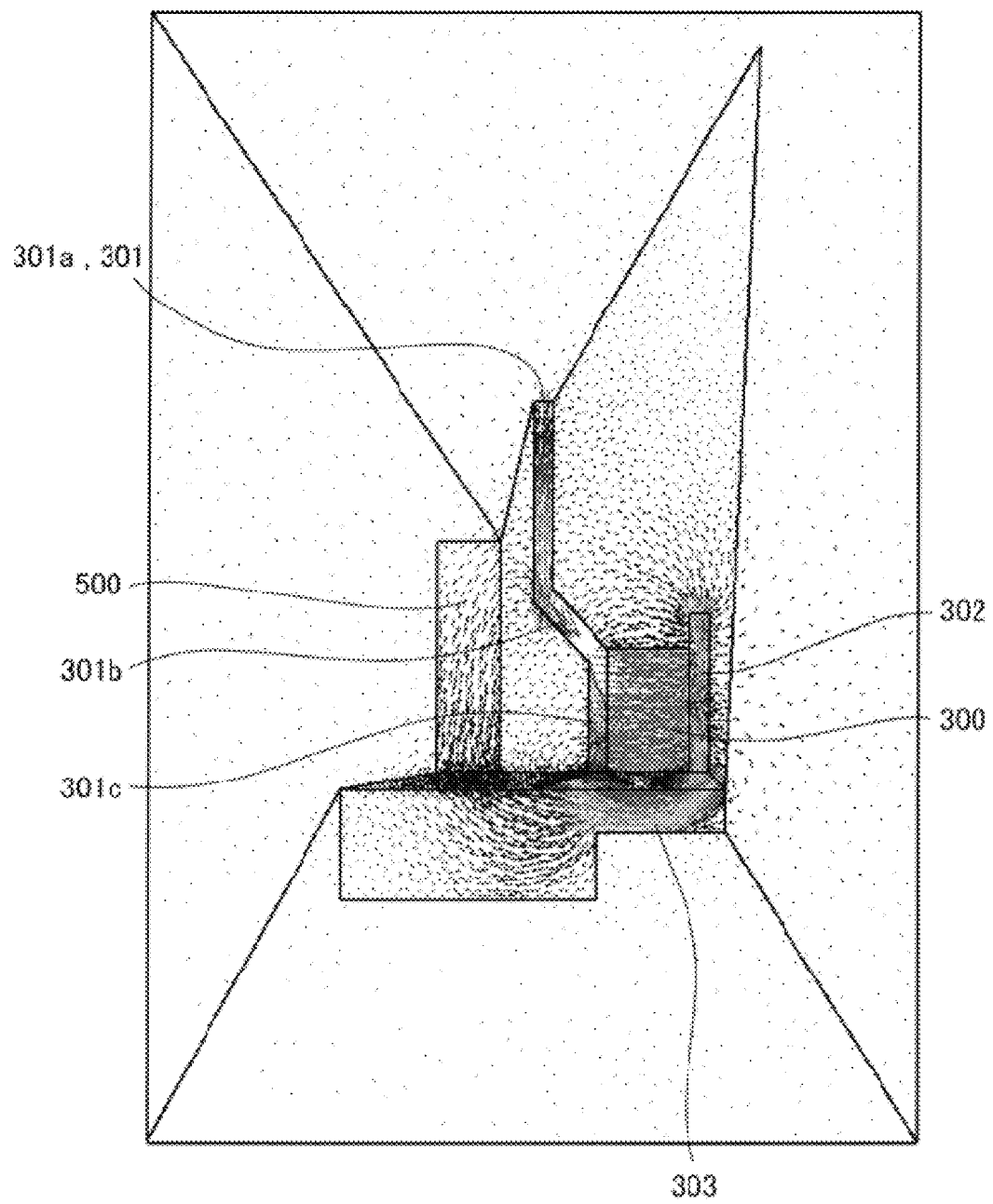
FIG. 9 is a view showing a result of magnetic field analysis of Example 2.
Figure 10:
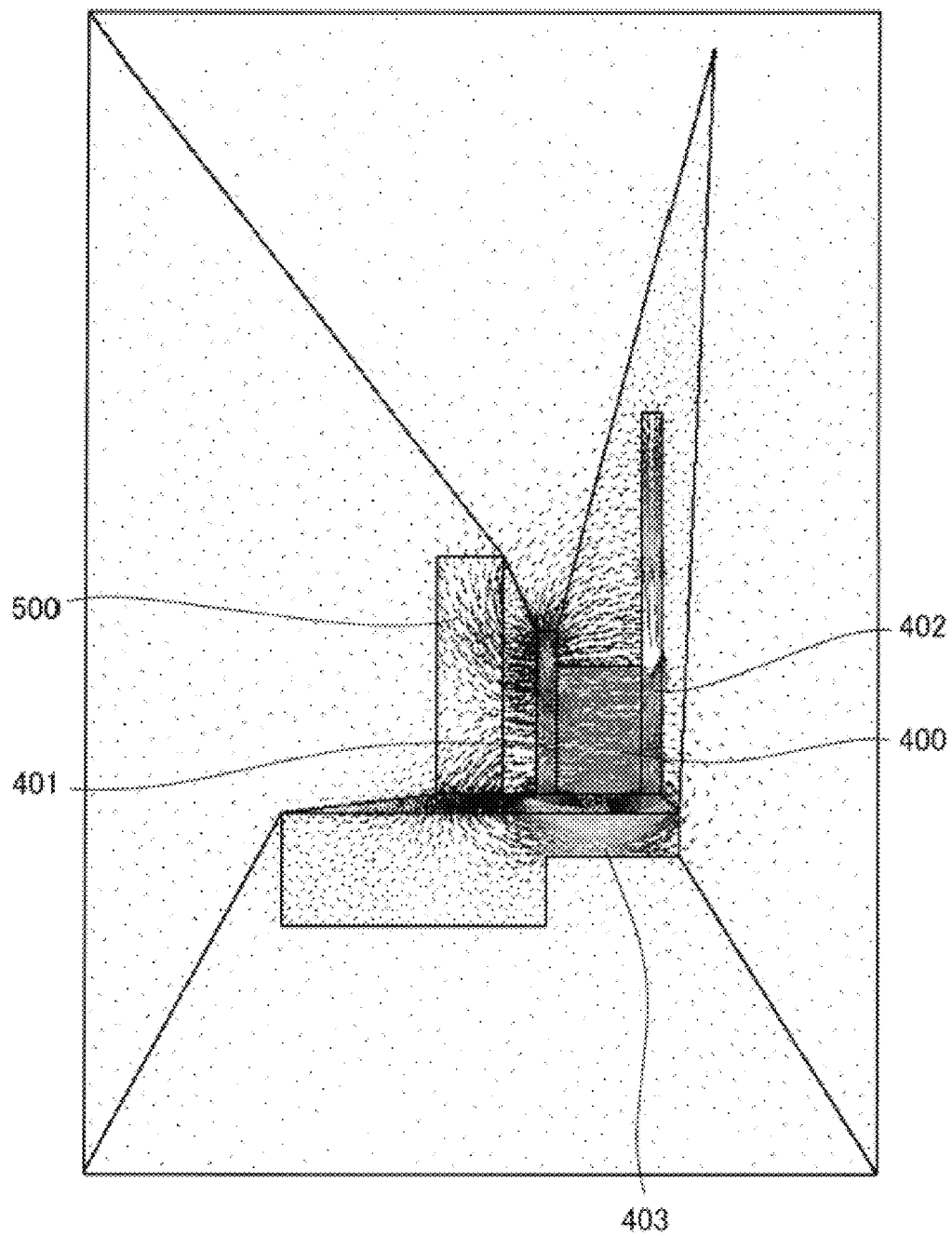
FIG. 10 is a view showing a result of magnetic field analysis of Comparative Example 1.

Next, with reference to FIG. 8 to FIG. 10, a description is concretely given of Examples 1 and 2 in comparison with Comparative Example 1. The present invention, however, is not limited to these examples. FIG. 8 to FIG. 10 show data representing results of magnetic field analysis of Examples 1 and 2 and Comparative Example 1. Dot-like substances shown in FIG. 8 to FIG. 10 represent magnetic flux. Furthermore, in FIG. 8 to FIG. 10, the higher a density of the dot-like substances, the higher a magnetic flux density.

Example 1

As shown in FIG. 8, a magnetic fluid seal mechanism of Example 1 may be provided with a permanent magnet 200, a first yoke plate 201 disposed on a rear side of the permanent magnet 200, a second yoke plate 202 disposed on a front side of the permanent magnet 200, and a magnetic portion 203 formed integrally with an inner ring of an anti-reverse device. In each of Examples 1 and 2 and Comparative Example 1, an iron piece 500 was disposed in place of the anti-reverse device. The first yoke plate 201 and the second yoke plate 202 may be formed to be larger in outer diameter than the permanent magnet 200. The first yoke plate 201 may be formed to be larger in outer diameter than the second yoke plate 202 and the iron piece 500.

Example 2

As shown in FIG. 9, a magnetic fluid seal mechanism of Example 2 may be provided with a permanent magnet 300, a first yoke plate 301 disposed on a rear side of the permanent magnet 300, a second yoke plate 302 disposed on a front side of the permanent magnet 300, and a magnetic portion 303 formed integrally with an inner ring of an anti-reverse device. Example 2 is different in that the first yoke plate 301 is used in place of the first yoke plate 201 of Example 1. The first yoke plate 301 may be formed to be larger in outer diameter than the second yoke plate 202 and the iron piece 500. The first yoke plate 301 may be provided with an outer circumferential portion 301*a* secured to an unshown body front portion, an annular intermediate portion 301*b* inclined from an inner circumferential edge of the outer circumferential portion 301*a* in a direction (forward) away from the iron piece, and an inner circumferential portion 301*c* continuous with an inner circumferential edge of the intermediate portion 301*b*. Therefore, the permanent magnet 300 and the iron piece 500 of Example 2 may be configured to be further away from each other in an axial direction than in Example 1.

Comparative Example 1

As shown in FIG. 10, a magnetic fluid seal mechanism of Comparative Example may be provided with a permanent magnet 400, a first yoke plate 401 disposed on a rear side of the permanent magnet 400, a second yoke plate 402 disposed on a front side of the permanent magnet 400, and a magnetic portion 403 formed integrally with an inner ring of an anti-reverse device. Comparative Example 1 may be different in that the first yoke plate 401 is used in place of the first yoke plate 201 of Example 1 and in that the second yoke plate 402 is used in place of the second yoke plate 202 of Example 1. The first yoke plate 401 and the second yoke plate 402 may be formed to be larger in outer diameter than the permanent magnet 200. The first yoke plate 402 may be formed to be larger in outer diameter than the first yoke plate 401 and the iron piece 500.

As shown in FIG. 8, in Example 1, magnetic flux generated on an outer circumferential side of the permanent magnet 200 may be mostly distributed on a curve connecting an outer circumferential edge of the second yoke plate 202 to a front surface of the first yoke plate 201 (specifically, a front surface of a portion of the first yoke plate radially outward with respect to an outer circumferential surface of the permanent magnet 200). Furthermore, although magnetic flux is distributed also on a rear surface side of the first yoke plate 201, a magnetic flux density thereof may be smaller than that between the outer circumferential edge of the second yoke plate 202 and the front surface of the first yoke plate 201. Furthermore, it is shown that there has been generated no magnetic flux going around from the outer circumferential edge of the second yoke plate 202 to a rear surface side of the first yoke plate 201.

As shown in FIG. 9, in Example 2, magnetic flux generated on an outer circumferential side of the permanent magnet 300 may be distributed on a curve connecting an outer circumferential edge of the second yoke plate 302 to a front surface of an outer circumferential portion of the first yoke plate 301. Furthermore, it is shown that, although magnetic flux is distributed also on a rear surface side of the first yoke plate 301, there has been generated no magnetic flux going around from the outer circumferential edge of the second yoke plate 302 to a rear surface side of the first yoke plate 301.

As shown in FIG. 10, in Comparative Example 1, magnetic flux generated on an outer circumferential side of the permanent magnet 400 may be distributed on a curve connecting a front surface of the second yoke plate 402 to an outer circumferential edge of the first yoke plate 401.

Furthermore, it is shown that a lot of magnetic flux is distributed on a curve connecting the front surface of the second yoke plate 402 to a rear surface of the first yoke plate 401 in such a manner as to go around a radially outer side of the outer circumferential edge of the first yoke plate 401.

Next, determination of a magnetic attraction force (a pulling force) of the iron piece 500 in each of Examples 1 and 2 and Comparative Example 1 was performed. Furthermore, a magnetic attraction force was determined at each of three points 0.2 mm, 0.5 mm, and 1.0 mm away from the iron piece 500, respectively.

Figure 11:
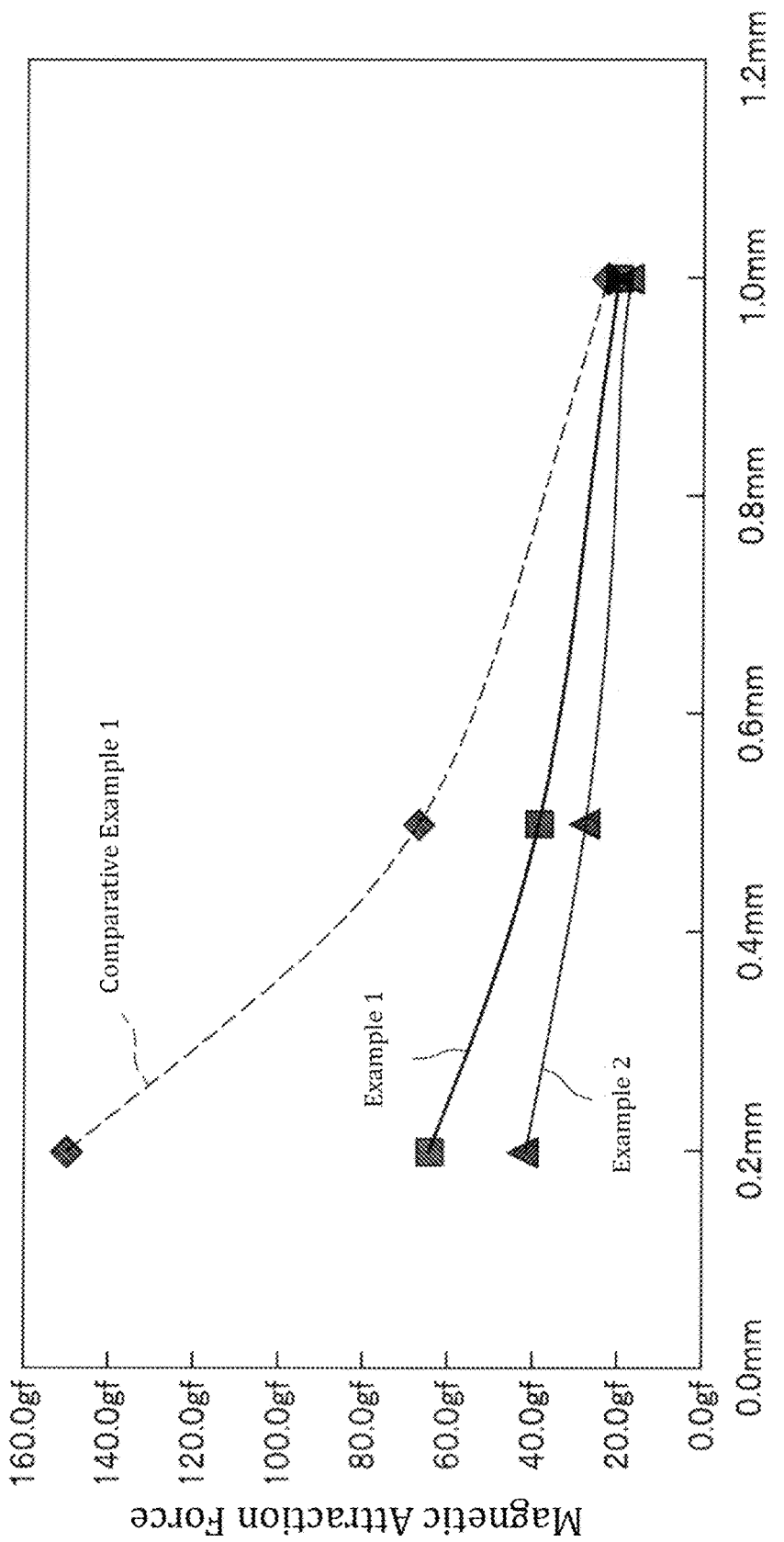
FIG. 11 is a graph showing a magnetic attraction force of each of Examples 1 and 2 and Comparative Example 1.

As shown in FIG. 11, Examples 1 and 2 provided respectively with the first yoke plates 201 and 301 formed to be larger in diameter than the second yoke plates 202 and 302, respectively, may have a magnetic attraction force smaller than that of Comparative Example 1. Therefore, it can be said that applying Examples 1 and 2 to a fishing spinning reel provides a preferable structure in which it is less likely that the roller is magnetically attracted to the inner ring in the anti-reverse device and torque loss and generation of unusual noise can be avoided. Furthermore, a comparison between Example 1 and Example 2 may find that Example 2 provided with the intermediate portion 301*b* has a magnetic attraction force smaller than that of Example 1. Therefore, it can be said that, in a fishing spinning reel, torque loss and generation of unusual noise can be more reliably avoided.

What is claimed is:

1. A fishing reel, comprising:
    a reel body having a body front portion positioned on a front side of the reel body;
    a drive shaft configured to be rotated by an operation of a handle that is mounted to the reel body;
    an anti-reverse device interposed between the reel body and the drive shaft; and
    a cylindrical member rotatably supported to the reel body, the cylindrical member surrounding an outer circumferential side of the body front portion of the reel body, and the cylindrical member surrounding an outer circumferential side of the anti-reverse device,
    wherein a switching control member of the anti-reverse device and the cylindrical member are engaged with each other, and a rotational operation of the cylindrical member causes the drive shaft to switch between an anti-reverse state and a reversible state.

2. The fishing reel according to claim 1, wherein at least a part of the cylindrical member is exposed to an exterior so as to be operable.

3. The fishing reel according to claim 1, wherein the cylindrical member has an operation portion extending from an end portion thereof and exposed to an exterior.

4. The fishing reel according to claim 1, wherein a seal is provided on an inner circumferential side of the cylindrical member.

5. The fishing reel according to claim 1, wherein the anti-reverse device is disposed in the body front portion in the reel body, and further comprising a magnetic fluid seal mechanism is provided in a front opening portion of the body front portion,
    wherein the magnetic fluid seal mechanism seals a gap between the front opening portion and the drive shaft.

6. The fishing reel according to claim 5, further comprising a sealed member made of a ferromagnetic material and interposed between the reel body and the drive shaft,
    wherein the magnetic fluid seal mechanism comprises:
        a magnetic portion formed in the drive shaft;
        a ring-shaped permanent magnet disposed on an outer circumferential side of the magnetic potion;
        a first yoke plate and a second yoke plate both having a ring shape and disposed on axially opposite sides of the permanent magnet; and
        a magnetic fluid disposed in a gap between the magnetic portion and the first and second yoke plates and held by a magnetic force, and
    wherein the first yoke plate is provided closer to the sealed member compared with the second yoke plate and has a larger outer diameter than the second yoke plate.

7. The fishing reel according to claim 6, wherein the sealed member is provided in the body front portion via the front opening portion, and
    wherein the first yoke plate covers the front opening portion.

8. The fishing reel according to claim 7, wherein the first yoke plate comprises:
    an annular outer circumferential portion secured to the body front portion;
    an annular intermediate portion extending from an inner circumferential edge of the outer circumferential portion in a direction away from the sealed member; and
    an annular inner circumferential portion continuous with an inner circumferential edge of the intermediate portion and configured to hold the permanent magnet.

9. The fishing reel according to claim 7, wherein the cylindrical member is disposed on the outer circumferential side of the body front portion,
    wherein the sealed member is the anti-reverse device, and
    wherein the switching control member of the anti-reverse device and the cylindrical member are engaged with each other, and a rotational operation of the cylindrical member causes the drive shaft to switch between the anti-reverse state and the reversible state.

10. The fishing reel according to claim 9, further comprising an elastic seal member formed of an elastic material and fitted on a circumferentially outer side of the permanent magnet so as to seal a clearance between the magnetic fluid seal mechanism and the front opening portion,
    wherein the second yoke plate projects radially outward beyond an outer circumferential surface of the permanent magnet, and
    wherein the elastic seal member is held between the first yoke plate and the second yoke plate.

11. The fishing reel according to claim 6, wherein the sealed member is the anti-reverse device or a bearing.

* * * * *